United States Patent [19]

Hopkins

[11] 3,950,610

[45] Apr. 13, 1976

[54] IMAGE ANALYSERS

[75] Inventor: Brian Martin Hopkins, Huntingdon, England

[73] Assignee: Becton, Dickinson & Company, Rutherford, N.J.

[22] Filed: July 16, 1974

[21] Appl. No.: 488,955

[30] Foreign Application Priority Data

July 16, 1973 United Kingdom............... 33791/73

[52] U.S. Cl. .............. 178/6; 178/6.8; 178/DIG. 34; 178/DIG. 36
[51] Int. Cl.² .......................................... H04N 7/18
[58] Field of Search ... 178/6, 6.8, DIG. 34, DIG. 36

[56] References Cited

UNITED STATES PATENTS

| | | | |
|---|---|---|---|
| 3,752,916 | 8/1973 | Lowry | 178/DIG. 34 |
| 3,804,980 | 4/1974 | Lowry | 178/DIG. 34 |
| 3,805,035 | 4/1974 | Serra | 178/DIG. 34 |

FOREIGN PATENTS OR APPLICATIONS

| | | |
|---|---|---|
| 1,293,315 | 10/1972 | United Kingdom |
| 1,197,097 | 7/1970 | United Kingdom |
| 1,199,801 | 7/1970 | United Kingdom |
| 1,110,319 | 8/1971 | United Kingdom |

OTHER PUBLICATIONS

J. A. Bruder "Instrumentation for Mapping Light Intensity Contours" *IEEE Trans. on Vehicular Technology* 8–70, pp. 225–229.

Y. M. Ting, W. Wilson, "Fingerprint Image Enhancement System" *IBM Technical Disclosure Bulletin*, 1–74, pp. 2284–2285.

*Primary Examiner*—Robert L. Griffin
*Assistant Examiner*—Edward L. Coles
*Attorney, Agent, or Firm*—Irving M. Weiner; Pamela S. Burt

[57] ABSTRACT

An image analyser for use in a line-by-line scanning system in which a field of an article is scanned to produce a video signal representative instantaneously of a point within that field. The analyser has n delay means connected in series where n is an integer divisible by 2, the video signal being applied to the input of the first delay means. The input of the first delay means and the output of each delay means other than the nth/2 delay means in the series, are connected to the inputs of an adder. The output of the nth/2 delay means in the series is connected to the input of a signal multiplier circuit. The outputs of the adder and of the multiplier are connected to a subtracting circuit which produces an output representative of the output of the multiplier minus the output of the adder.

7 Claims, 3 Drawing Figures

IMAGE ANALYSERS

This invention relates to an image analyser.

BACKGROUND OF THE INVENTION

It is known to produce an image of an object by scanning a field of that object on a line-by-line basis. The resulting signal (the video signal) is displayed on a cathode ray tube and the video signal can be compared to a television video signal. The object may be scanned by a television camera. Where a microscopic specimen is to be examined, the t.v. camera is focussed on a field of the specimen by means of a microscope.

It is desirable to be able to select features of the displayed image and for this purpose it is of course possible to compare the video signal with a reference voltage. However because the scanning spot has a finite size the amplitude of the video signal takes a finite time to change at the beginning and end of each feature. The true beginning and end of each feature is when the amplitude of the video signal has changed by 50% of the total change which will take place (the half-amplitude points), and the amplitudes of these points varies with the amplitude of the signal change and the amplitude of the background level on which the features lie. Consequently, if the fixed voltage is used as the reference voltage, misleading results may result.

It is an object of this invention to provide an improved image analyser.

It is today common to provide an automatic analyzer for automatically analyzing the image of a cathode ray tube. Conventionally a specimen, for example, a blood sample, is brought into the field of vision of a microscope with a TV camera connected to the microscope so that effectively the TV camera is focused on a field of the specimen by means of that microscope. The output of the TV camera is connected to a cathode ray tube which thus displays a magnified image of the part of the sample within that field. Certain features will appear within that image and it is a requirement to electronically analyze that image. For example, one or more cells of any type may appear in the image and it may be desired to measure the area of that cell. An electron beam scans the screen of the microscope in a raster in a conventional manner. In order to measure the area of a cell (all taken as an example) it is necessary to analyze the input video signal so as to pick up the beginning and the end of the part of the video signal which represents that feature. The video signal does not change instantaneously because the scanning spot produced by the electron beam has a finite area, and the beginning and end of a feature is normally accepted to be when half the eventual change in amplitude of the video signal has occurred. In other words, there is a degradation of feature edges due to the finite scanning spot size of the TV camera. However, feature edge rise and fall times are also degraded due to the optical resolution limit of the microscope and the bandwith of the video amplifier which processes the signal on the TV camera. These latter two defects in resolution are normally more significant than the aforementioned finite scanning spot size defect condition. The reason for using the half amplitude points to define the feature edge is that this is the best approximation to the true size of the feature prior to undergoing the resolution restrictions of the optical and electronic measurement system. Also, it imposes an accurate measurement boundary for any feature, irrespective of the setting of the detection threshold.

SUMMARY OF THE INVENTION

According to this invention there is provided an image analyser for use in a line-by-line scanning system in which a field of an article is scanned to produce a video signal representative instantaneously of a point within that field, comprising n delay means connected in series where $n$ is the an integer divisible by 2, the video signal being intended to be applied to the input of the first delay means, an adder to whose inputs are connected the undelayed video signal and the output of the or each delay means other than the $n$th/2 delay means in the series, a signal multiplier circuit to the input of which the output of the $n$th/2 delay means in the series is connected, and which is arranged to multiply the signal received by $n$, and a subtracting circuit connected to the outputs of the adder and of the multiplier and arranged to produce an output representative of the output of the multiplier minus the output of the adder.

In use, in the event of a feature in the video signal the polarity of the output of the subtractor changed at the half-amplitude points of the leading and trailing edges of the feature so that the output of the subtractor can be utilized to detect these points.

The integer $n$ may be 2 but is preferably higher for better resolution.

Preferably the analyser comprises comparator means to one input of which the output of the subtractor is connected and to the other input of which there is connected a terminal to which a fixed potential is intended to be applied.

Preferably the analyser comprises n comparators to the corresponding inputs of which there are connected the input of the first delay means and the outputs of the delay means other than the $n$th/2/ delay means in the series, the other input of each comparator being connected to a reference voltage generator. The ouput of each comparator is connected firstly to a first AND gate and secondly to a first OR gate, the outputs of the first AND gate and the comparator means being connected to a second OR gate, the output of the first and second OR gates being connected to a second AND gate.

The output of the second AND gate changes in use from one value to a second value at the half-amplitude point in the leading edge of a feature, and changes back from its second to its first value at the half-amplitude point at the trailing edge of that feature.

Another object of the present invention is to provide automatic electronic equipment which will detect the half-amplitude points.

BRIEF DESCRIPTION OF THE DRAWINGS

An image analyser in accordance with this invention will now be described, by way of example only, with reference to the accompanying drawings of which.

DETAILED DESCRIPTION

Figure 1:
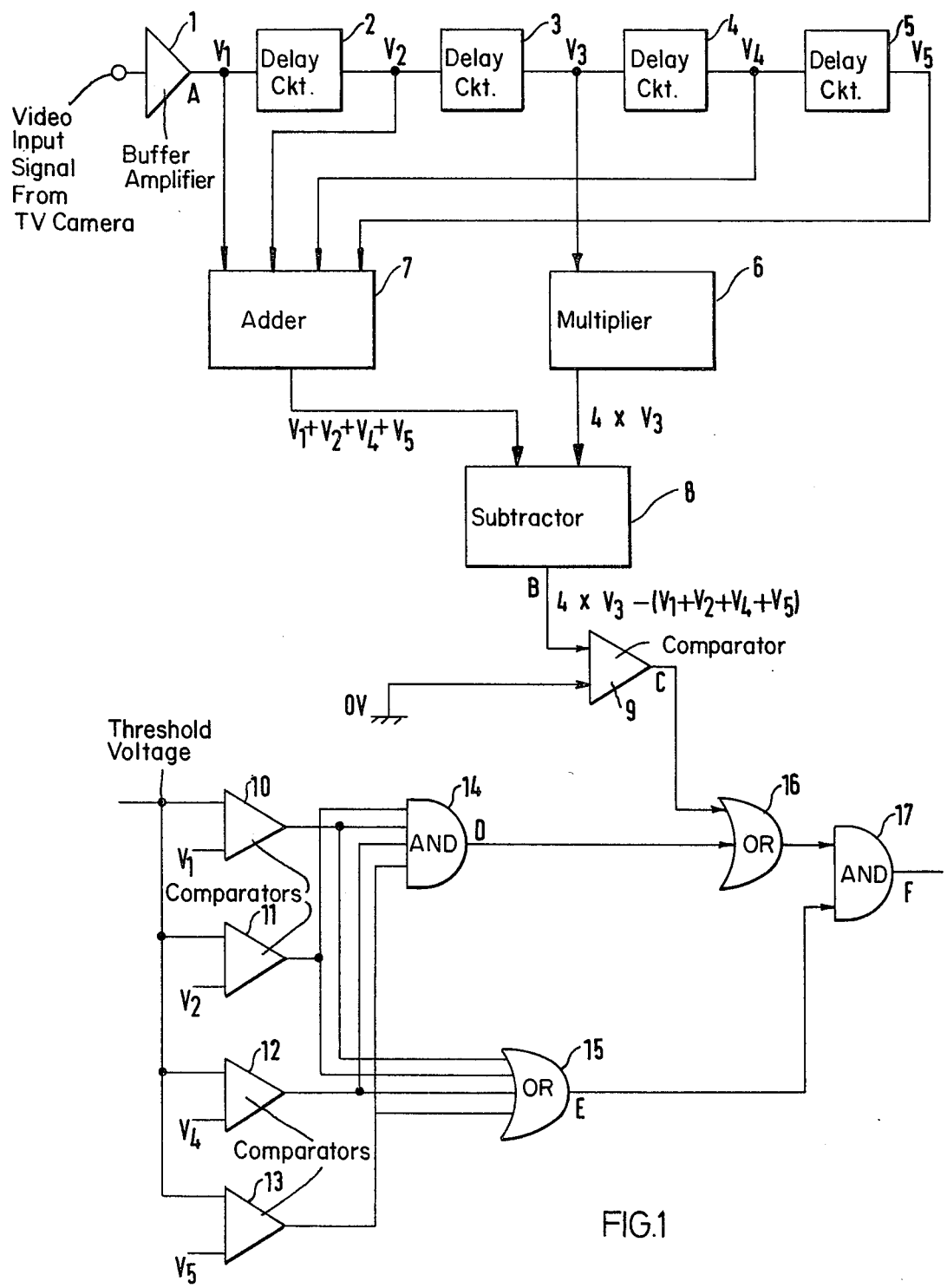
FIGS. 1 and 2 are block diagrams of different parts of the analyser.

Referring first to FIG. 1 a video input signal derived from a t.v. camera and arranged to scan a field of an image through a microscope is applied through a buffer amplifier 1 to four delay circuits 2, 3, 4 and 5 connected in series and all having the same delay of t seconds. The input video signal on the first delay circuit 2 is designated by $V_1$ and the outputs of the delay circuits 2, 3 and 4 and 5 are designated $V_2$, $V_3$ (shown in FIG. 3 in waveform A), $V_4$ and $V_5$ respectively.

The video signal at the center of the pattern that is $V_3$ is passed to an analogue multiplier 6 where it is multiplied by a factor of 4. The number 4 is equal to the number of other video signals making up the pattern. The other four video signals $V_1$, $V_2$, $V_4$ and $V_5$ are fed to an analogue adder 7 at whose output the arithmetic sum is obtainable, i.e., $V_1 + V_2 + V_4 + V_5$. The ouput of the analogue adder 7 is subtracted from the output of the analogue multiplier 6 in an analogue subtractor 8 to give $4 \times V_3 - (V_1+V_2+V_4+V_5)$ which is shown as waveform B in FIG. 3.

The output signal of the analogue subtractor 8 is compared with zero volts in a comparator 9 which is such that it will compare the two analogue signals at its inputs and will give a logic state output dependent on the instantaneous relative amplitudes of the two inputs. The output of the comparator 9 is shown at C in FIG. 3.

Figure 3:
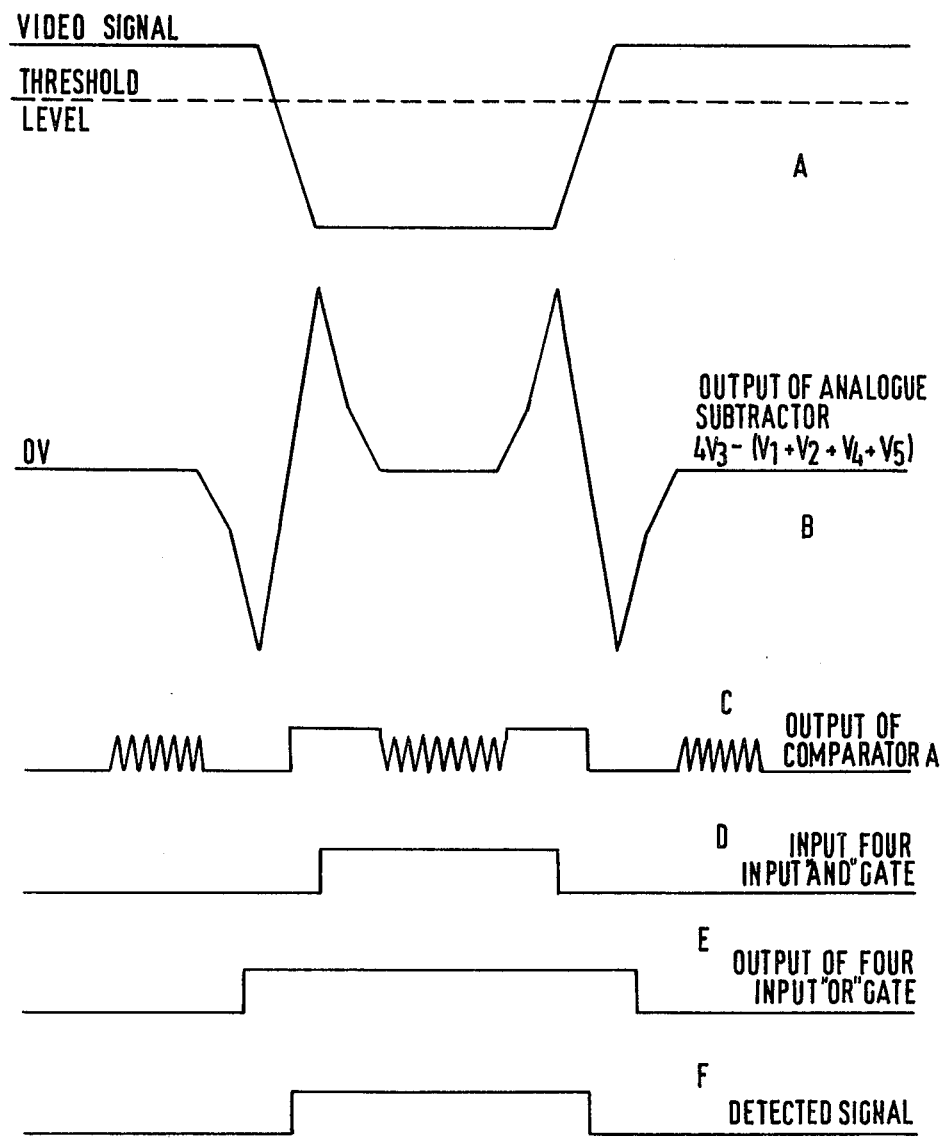
FIG. 3 shows a waveform occurring at different points in the part of the image analyser shown in FIG. 1.

Four comparators 10, 11, 12 and 13 each receive at a first input a threshold voltage and, at their second inputs, the video signals $V_1$, $V_2$, $V_4$ and $V_5$, respectively. Each of the comparators 10 to 13 produces one level when the threshold voltage exceeds its video signal and a different level when its received video signal exceeds the threshold voltage. The outputs of the four comparators 10 to 13 are all fed to an AND gate 14 and also to an OR gate 15 the output waveforms of which are shown in FIG. 3 in waveforms D and E, respectively, The outputs of the comparator 9 and the AND gate 14 are fed to an OR gate 16 whose output is fed together with that of the OR gate 15 to an AND gate 17. The output of the AND gate 17 is the detected signal and is shown at F in FIG. 3.

It will be seen by consideration of FIG. 3 that the detected signal changes from a first level to a second level at the half-amplitude point of the leading edge of the feature and reverts back to its first level at the half-amplitude point of the trailing edge of the feature. The function of the logic circuit made up of the comparators 10 to 13 and gates 14 to 17 is to eliminate the noise which occurs away from these transition edges.

Figure 2:
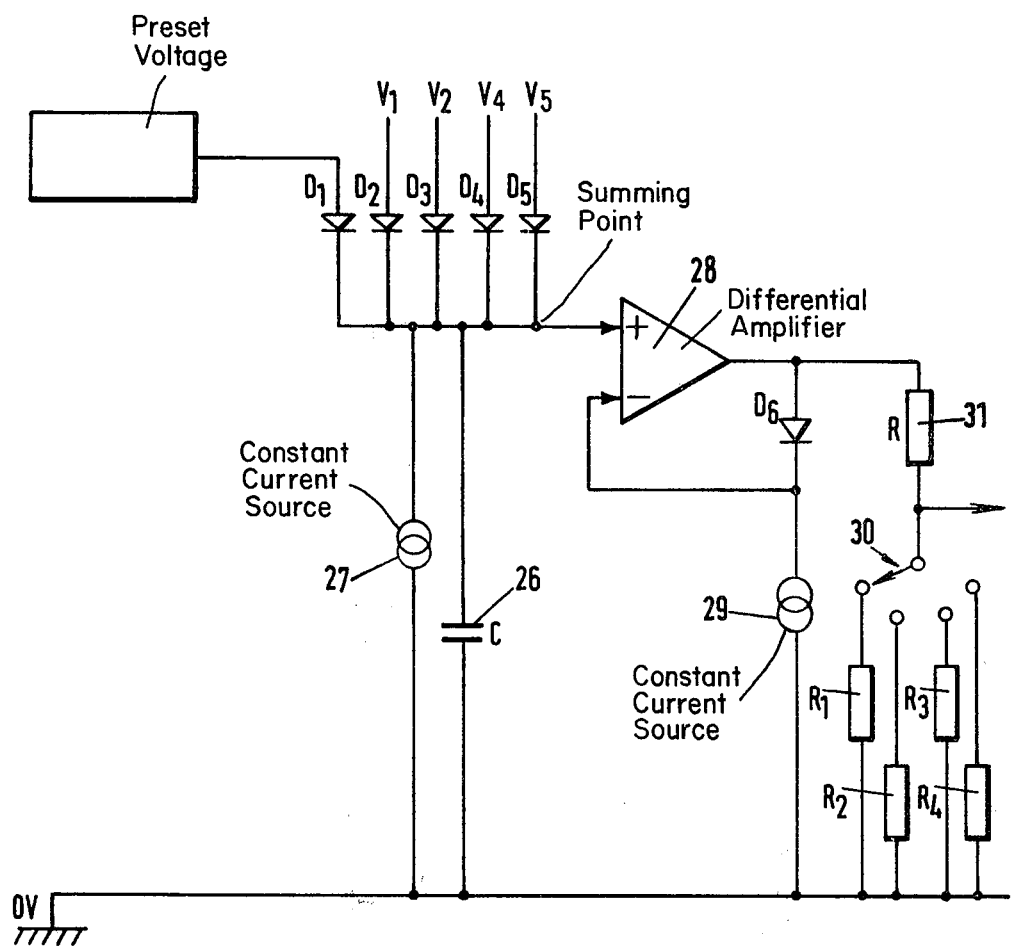

FIG. 2 shows the threshold voltage generator and the object of this circuit is to overcome slow variations in the video signal background level and to relate the threshold signal to the background level of the video signal.

Referring now to FIG. 2, the four outer video signals of the video pattern, i.e., $V_1$, $V_2$, $V_4$ and $V_5$, are applied to the anodes of diodes $D_2$, $D_3$, $D_4$ and $D_5$, respectively, whose cathodes are connected to a summing point. A present d.c. voltage is applied to the anode of a further diode $D_1$ whose cathode is connected to the same summing point. The d.c. level applied to the diode $D_1$ is referred to as the lower shading limit.

The summing point is connected to earth through a capacitor 26, shunted by a constant current source or generator 27, and is also connected to one input of a differential amplifier 28 whose output is connected through a diode $D_6$ to the second input of the amplifier 28. The second input of the amplifier 28 is also connected to earth through a constant current source or generator 29. The output of the amplifier 28 is connected to the moving contact of a selector switch 30 through a resistor 31. The four fixed contacts of the selector switch 30 are connected to earth through resistors $R_1$, $R_2$, $R_3$ and $R_4$, respectively. The potential appearing at the moving contact of the selector switch 30 is the selected threshold voltage.

The principle of the system is that by applying the outer video signal $V_1$, $V_2$, $V_4$, and $V_5$ of the generated pattern to the diodes $D_2$ to $D_5$ the threshold signal will be forced to follow the variations of the background of the video signal due to shading or other low frequency effects. To avoid the generated threshold signal following the background when a feature is encountered the capacitor 26 introduces an effective maximum rate of decay on the threshold signal. Thus the threshold voltages hold up with only a small sag due to capacitor discharge when a feature is encountered. The object of applying the lower shading limit d.c. signal to diode $D_1$ is to set a lower limit on the threshold voltage which limit is such that it is the level of the lowest d.c. value of the inherent shading of the video signal. The diode $D_6$ has the same forward drop as diodes $D_1$ to $D_5$, respectively, and compensates for the forward drop in each of those diodes when it conducts. Diodes $D_1$ to $D_6$ are of course matched.

The output voltage of the amplifier 28 is divided by the voltage divider constituted by the resistor 31 and the selected one of the resistors $R_1$ to $R_4$.

There is hereby incorporated by reference thereto the disclosures of prior filed, commonly owned U.S. patent application, Ser. No. 458,283 filed on Apr. 5, 1974 entitled "IMAGE DISPLAY APPARATUS", and U.S. patent application Ser. No. 458,284 filed on Apr. 5, 1974 entitled "IMAGE ANALYSES APPARATUS". The aforementioned U.S. patent application Ser. No. 458,283 describes further parts of the image analyzer with which the present invention is concerned, and the microscope and the television camera and the television display device are common to the present invention and to the invention of U.S. patent application Ser. No. 458,283. The aforementioned U.S. patent application Ser. No. 458,284 illustrates how fields are selected for magnifications, and there is therein described a mode in which the cathode ray tube displays to a higher magnification a point indicated on the screen. It is intended that at such higher magnification referred to in the aforementioned U.S. patent application Ser. No. 458,284 the features within the image will be analyzed utilizing the part of the apparatus which is illustrated in the present application and which is the subject matter of the present invention.

I claim:

1. An image analyser for use in a line-by-line scanning system in which a field of an article is scanned to produce a video signal representative instantaneously of a point within that field, comprising $n$ delay means connected in series where $n$ is an integer divisible by 2, the video signal being applied to the input of the first delay means, an adder to whose inputs are connected the input of the first delay means and the output of each delay means other than the $n$th/2 delay means in the series, a signal multiplier circuit to the input of which the output of the $n$th/2 delay means in the series is connected, and which multiplies the signal received by $n$, and a subtracting circuit which is connected to the outputs of the adder and of the multiplier and which produces an output representative of the output of the multiplier minus the output of the adder.

2. An image analyser as claimed in claim 1 which comprises comparator means to one input of which the output of the subtractor is connected and to the other input of which there is connected a terminal to which a fixed potential is applied.

3. An image analyser as claimed in claim 2 which comprises $n$ comparators to the corresponding inputs of which there are connected the input of the first delay means and the outputs of the delay means other than the $n$th/2 delay means in the series, the other input of each comparator being connected to a reference voltage generator, the output of each comparator being connected firstly to a first AND gate and secondly to a first OR gate, the outputs of the first AND gate and the comparator means being connected to a second OR gate, the output of the first and second OR gates being connected to a second AND gate.

4. An image analyser as claimed in claim 3 wherein the reference voltage generator comprises $n$ diodes to corresponding electrodes of which are connected the input of the first delay means and the outputs of the delay means other than the $n$th/2 delay means of the series, the other electrodes being connected together and through a constant current generator and a capacitor in parallel to a terminal to which a fixed potential is applied.

5. An image analyser as claimed in claim 4 which comprises a differential amplifier having first and second inputs and an output, the junction of the said other electrodes being connected to the first input, the second input being connected to the said terminal through a further constant current generator, and a further diode through which the output of the differential amplifier is connected to its second input.

6. An image analyser as claimed in claim 4 which comprises a further terminal to which a preset potential is applied and which is connected through another diode to the junction of the said other electrodes.

7. An image analyser as claimed in claim 5 wherein the output of the differential amplifier is connected through a resistor to a movable contact of a selector switch having a plurality of fixed contacts each connected through an individual resistor to the said terminal.

* * * * *